United States Patent [19]
Slagel

[11] Patent Number: 6,127,505
[45] Date of Patent: *Oct. 3, 2000

[54] IMPACT RESISTANT POLYURETHANE AND METHOD OF MANUFACTURE THEREOF

[75] Inventor: Edwin C. Slagel, Avondale, Ariz.

[73] Assignee: Simula Inc., Phoenix, Ariz.

[ * ] Notice: This patent is subject to a terminal disclaimer.

[21] Appl. No.: 09/145,658

[22] Filed: Sep. 2, 1998

Related U.S. Application Data

[63] Continuation-in-part of application No. 08/595,262, Feb. 1, 1996, Pat. No. 5,962,617, which is a continuation-in-part of application No. 08/382,562, Feb. 2, 1995, abandoned.

[51] Int. Cl.$^7$ ..................................................... C08G 18/02
[52] U.S. Cl. .................................. 528/61; 528/63; 528/64
[58] Field of Search .................................. 528/61, 63, 64

[56] References Cited

U.S. PATENT DOCUMENTS

| | | |
|---|---|---|
| 2,644,007 | 6/1953 | Irwin . |
| 2,680,127 | 6/1954 | Slocombe et al. . |
| 2,830,037 | 4/1958 | Carter . |
| 2,908,703 | 10/1959 | Latourette et al. . |
| 2,929,800 | 3/1960 | Hill, Jr. . |
| 2,929,804 | 3/1960 | Steuber . |
| 2,999,839 | 9/1961 | Arvidson, Jr. et al. . |
| 3,127,855 | 4/1964 | Conlon . |
| 3,192,186 | 6/1965 | Muller et al. . |
| 3,369,836 | 2/1968 | Haycock et al. . |
| 3,370,302 | 2/1968 | Karlyn . |
| 3,428,711 | 2/1969 | Hunt . |
| 3,456,037 | 7/1969 | Hoeschele . |
| 3,600,358 | 8/1971 | Taub . |
| 3,620,905 | 11/1971 | Abramjian . |
| 3,718,624 | 2/1973 | Rustad . |
| 3,755,262 | 8/1973 | Slagel . |
| 3,766,148 | 10/1973 | Taub . |
| 3,789,032 | 1/1974 | Hoeschele . |
| 3,798,200 | 3/1974 | Kaneko et al. . |
| 3,849,360 | 11/1974 | Farah et al. . |
| 3,866,242 | 2/1975 | Slagel . |
| 3,932,360 | 1/1976 | Ceranowski et al. . |
| 3,947,426 | 3/1976 | Lander . |
| 3,963,681 | 6/1976 | Kaneko et al. . |
| 4,062,834 | 12/1977 | Gilding et al. . |
| 4,071,492 | 1/1978 | Bethea et al. . |
| 4,088,627 | 5/1978 | Gergen et al. . |
| 4,101,473 | 7/1978 | Lander . |
| 4,106,313 | 8/1978 | Boe . |
| 4,208,507 | 6/1980 | Stutz et al. ................................ 528/64 |
| 4,374,210 | 2/1983 | Ewen et al. . |
| 4,376,834 | 3/1983 | Goldwasser et al. . |
| 4,447,590 | 5/1984 | Szycher . |
| 4,476,292 | 10/1984 | Ham et al. . |
| 4,523,005 | 6/1985 | Szycher . |
| 4,546,167 | 10/1985 | Chang . |
| 4,762,884 | 8/1988 | Goyert et al. . |
| 4,808,690 | 2/1989 | Slagel . |
| 4,810,749 | 3/1989 | Pinchuk . |
| 4,877,856 | 10/1989 | Hall et al. . |
| 5,011,409 | 4/1991 | Gray . |
| 5,066,761 | 11/1991 | Miyazaki . |
| 5,266,669 | 11/1993 | Onwunaka . |
| 5,393,858 | 2/1995 | Meijs et al. . |
| 5,410,009 | 4/1995 | Kato et al. . |
| 5,811,506 | 9/1998 | Slagel . |
| 5,962,617 | 10/1999 | Slagel ....................................... 528/61 |
| 5,962,619 | 10/1999 | Seneker et al. . |

FOREIGN PATENT DOCUMENTS

| | | |
|---|---|---|
| 0 000 360 | 1/1979 | European Pat. Off. . |
| 0 220 641 | 2/1990 | European Pat. Off. . |
| PCT/US96/01425 | 8/1996 | WIPO . |
| PCT/US97/09558 | 11/1997 | WIPO . |

OTHER PUBLICATIONS

Young et al., "Polyesters from Lactones," Research Development, Carbide and Carbon Chemicals company, Oct. 1959.

Oertel, Gunther, *Polyurethane Handbook*, 1985.

*Primary Examiner*—Jeffery C. Mullis
*Attorney, Agent, or Firm*—Shaw Pittman

[57] ABSTRACT

The present invention is an optically clear, high hardness, impact resistant polyurethane which provides exceptionally high heat distortion temperatures and excellent chemical resistance. The invention is particularly useful for transparency applications that require excellent impact resistance coupled with high heat distortion temperatures, such as architectural glazings vehicles, glazings, riot shields, aircraft canopies, face masks, visors, opthalmic and sun lenses, protective eyewear, and transparent armor.

37 Claims, No Drawings

IMPACT RESISTANT POLYURETHANE AND METHOD OF MANUFACTURE THEREOF

This application is a continuation-in-part of U.S. Ser. No. 08/595,262, now U.S. Pat. No. 5,962,617 filed Feb. 1, 1996 is a continuation-in-part of U.S. Ser. No. 08/382,562 filed Feb. 2, 1995 now abandoned, both of which are incorporated herein by reference.

BACKGROUND

1. Field of the Invention

The present invention relates to a rigid, optically transparent heat and impact resistant polyurethane.

2. Background of the Invention

Currently, the standard material to which all optically transparent plastic materials are compared to for impact resistance is polycarbonate. These materials can be characterized by impact resistance and the temperature and pressure at which the material undergoes distortion. The heat distortion temperature of polycarbonate is about 280° F. at 264 psi fiber stress.

Polycarbonate extruded sheet at a thickness of 0.25 inches has a 0.22 caliber FSP (fragment simulating projectile) V-50 impact rating of 925 ft./sec. The V-50 is the measure of the velocity at which 50% of 22-caliber projectiles fired through a 0.25 inch polycarbonate sheet penetrate a 20 millimeter-thick 2024 T6 aluminum sheet (the "witness sheet") placed 6 inches behind the back surface of the polycarbonate sheet.

U.S. Pat. No. 3,866,242, which is incorporated herein by reference, discloses a polyurethane polymer protective shield. The polyurethane is produced by:

(a) reacting either a polyether glycol or a polyester glycol having a molecular weight of from about 700 to 1,000 with methylenebis(cyclohexyl isocyanate) in an equivalent ratio of about three NCO to each hydroxyl to form a prepolymer, and (b) reacting the prepolymer with an aromatic amine curing agent having a methylene bridge between two aromatic rings, such as 4,4'-methylenebis(2-chloroaniline), in an equivalent ratio of 0.90 to 1.04 $NH_2/1.0$ NCO.

U.S. Pat. No. 4,808,690, which is incorporated by reference herein, discloses a transparent polyurethane polymer made from a polyol cured prepolymer. The prepolymer is made from a polyisocyanate and at least one multifunctional hydroxy-containing intermediate.

U.S. Pat. No. 4,208,507 discloses a flexible polyurethane-urea elastomer prepared by reacting: (A) a prepolymer obtained by reacting an essentially difunctional polyhydroxy compound having a molecular weight of from 600 to 10,000, and an organic diisocyanate having at least one NCO group bonded to a cycloaliphatic structure, in amounts which provide a total OH:NCO ratio of from 1:1.2 to 1:10, with (B) 3,3', 5,5'-tetramethyl-4,4'-diamino-diphenylmethane, A and B being reacted in a molar ratio of from about 1:0.8 to 1:1.2.

SUMMARY OF THE INVENTION

The optically clear polyurethane of this invention can be prepared by first producing an aliphatic or a prepolymer by reacting one or more polyester glycols, polycaprolactone glycols, polyether glycols, or polycarbonate glycols having a weight average molecular weight of from about 400 to about 2000 with a cycloaliphatic diisocyanate in an equivalent ratio of about 2.5 to 4.0 NCO for each OH. The prepolymer is then reacted with an aromatic diamine curing agent such as diethyltoluene diamine in an equivalent ratio of about 0.85 to 1.02 $NH_2/1.0$ NCO, preferrably about 0.90 to 1.0 $NH_2/1.0$ NCO, and more preferrably about 0.92 to 0.96 $NH_2/1.0$ NCO.

The polyurethane of the present invention is particularly useful for transparency applications that require excellent impact resistance coupled with high heat distortion temperatures, such as architectural glazings, vehicle glazings, riot shields, aircraft canopies, face masks, visors, opthalmic and sun lenses, protective eyewear, and transparent armor.

One object of this invention is to provide transparent polyurethanes having excellent optical clarity, excellent ballistic properties, high chemical resistance, and high heat distortion temperatures compared to prior art materials.

Another object of this invention is to provide reduced cost transparent impact resistant polyurethanes for commercial applications.

Yet another object of this invention is to enhance production processing of transparent impact resistant polyurethanes by decreasing reaction time, processing temperature, and mold residence time.

These and other objects of the present invention are described in greater detail in the detailed description of the invention, the examples and the attached claims.

DETAILED DESCRIPTION OF THE INVENTION

The polyurethane of the present invention is prepared from aliphatic or cycloaliphatic diisocyanates, OH-containing intermediates, and aromatic diamine curing agents. The following is a detailed description of each of these constituents:

OH-Containing Intermediates

The OH-containing intermediates which can be used to prepare the polyurethanes of this invention include polyester glycols, polycaprolactone glycols, polyether glycols, and polycarbonate glycols having a weight average molecular weight of from about 400 to about 2000, preferrably about 400 to about 1000.

Polyester glycols that can be used include the esterification products of one or more dicarboxylic acids having four to ten carbon atoms, such as adipic, succinic and sebacic acids, with one or more low molecular weight glycols having two to ten carbon atoms, such as ethylene glycol, propylene glycol, diethylene glycol, 1,4-butanediol, neopentyl glycol, 1,6-hexanediol and 1,10-decanediol. Preferred polyester glycols are the esterifiation products of adipic acid with glycols of two to ten carbon atoms.

Polycaprolactone glycols that can be used include the reaction products of E-caprolactone with one or more of the low molecular weight glycols listed above. In addition, useful OH-containing intermediates may include teresters produced from one or more low molecular weight dicarboxylic acids, such as adipic acid, and caprolactones with one or more of the low molecular weight glycols listed above.

The preferred polyester glycols and polycaprolactone glycols can be derived by well known esterification or transesterification procedures, as described, for example, in the article D. M. Young, F. Hostettler et al., "Polyesters from Lactone," Union Carbide F-40, p. 147.

Polyether glycols that can be used include polytetramethylene ether glycol.

Polycarbonate glycols that can be used include aliphatic polycarbonate glycols. Preferred aliphatic polycarbonate glycols are those manufactured and sold by Enichem under the tradename Ravecarb 102 (molecular weight=1,000) and Ravecarb 106 (molecular weight=2,000).

The most preferred OH-containing intermediates are: (a) esterification products of adipic acid with one or more diols selected from 1,4-butanediol, 1,6-hexanediol, neopentyl glycol, and 1,10-decanediol; (b) reaction products of E-caprolactone with one or more diols selected from 1,4-butane diol, 1,6-hexane diol, neopentyl glycol, and 1,10-decanediol; (c) polytetramethylene glycol; (d) aliphatic polycarbonate glycols, and (e) mixtures of such OH-containing intermediates.

Diisocyanates

The aliphatic or cycloaliphatic diisocyanates which can be used to prepare the polyurethanes of this invention include dicyclohexylmethane diisocyanate and preferably isomeric mixtures thereof containing from about 20–100 percent of the trans,trans isomer of 4,4'-methylenebis(cyclohexyl isocyanate), hereinafter referred to as "PICM" (paraisocyanato cyclohexylmethane). Other components usually present in the mixtures of position and/or stereoisomers of the dicyclohexylmethane diisocyanate used in this invention are the cis,trans and cis,cis isomers of PICM and stereoisomers of 2,4'-methylenebis(cyclohexyl isocyanate). These, as well as the trans,trans PICM isomer, are present in amounts which can be controlled by the procedures used to prepare the dicyclohexylmethane diisocyanate. Preferred diisocyanates are isomeric PICM mixtures. An especially preferred mixture contains not less than about 20 percent of the trans,trans isomer and no more than about 20 percent of the cis,cis isomer of 4,4'-methylenebis(cyclohexyl isocyanate). Three isomers of 4,4'-methylenebis(cyclohexyl isocyanate) are shown below:

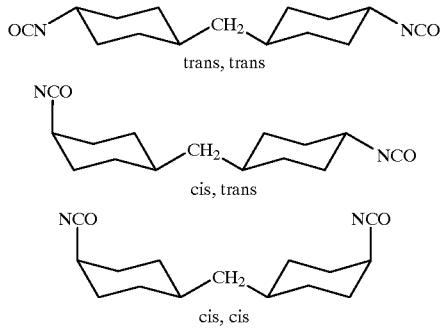

The PICM used in this invention is prepared by phosgenating the corresponding 4,4'-methylenebis(cyclohexyl amine) (PACM) by procedures well known in the art, as disclosed in, e.g., U.S. Pat. Nos. 2,644,007, 2,680,127, and 2,908,703, which are incorporated herein by reference. The PACM isomer mixtures, upon phosgenation, yield PICM in a liquid phase, a partially liquid phase, or a solid phase at room temperature. The PACM isomer mixtures can be obtained by the hydrogenation of methylenedianiline and/or by fractional crystallization of PACM isomer mixtures in the presence of water and alcohols such as methanol and ethanol.

Additional aliphatic and cycloaliphatic diisocyanates that may be used include 3-isocyanato-methyl-3,5,5-trimethyl cyclohexyl-isocyanate ("IPDI") from Arco Chemical, which has the following structural formula:

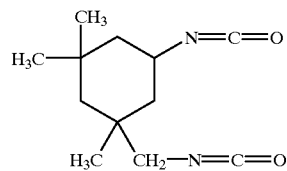

and meta-tetramethylxylene diisocyanate (1,3-bis(1-isocyanato-1-methylethyl)-benzene), which is sold by Cytec Industries Inc. under the tradename TMXDI® (Meta) Aliphatic Isocyanate, and, which has the following structural formula:

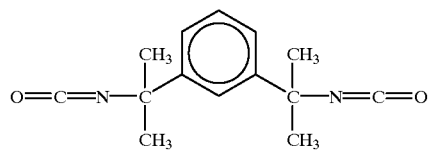

References to aliphatic and cycloaliphatic diisocyanates in the specification and claims are intended to encompass TMXDI and compounds of the formula R—(NCO)$_2$ where R is an aliphatic group or a cycloaliphatic group and otherwise does not embrace aromatic diisocyanates.

Diamine Curing Agents

The preferred aromatic diamine curing agents for use in preparing the polyurethanes of the invention are 2,4-diamino-3,5-diethyl-toluene, 2,6-diamino-3,5 -diethyl-toluene and mixtures thereof (collectively "diethyltoluenediamine" or "DETDA"), which is sold by Albemarle Corporation under the trade name Ethacure 100. DETDA is a liquid at room temperature with a viscosity of 156 cs at 25° C. DETDA is isomeric, with the 2,4-isomer range being 75–81 percent while the 2,6-isomer range is 18–24 percent. DETDA has the following structure:

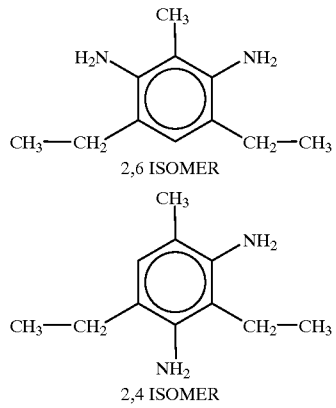

The color stabilized version of Ethacure 100, which is available under the name Ethacure 100S, is particularly preferred.

Additional diamine curing agents for use in the present invention include compounds having the following chemical formula:

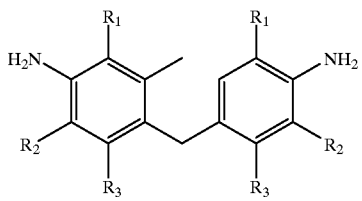

wherein $R_1$ and $R_2$ are each independently selected from methyl, ethyl, propyl, and isopropyl groups, and $R_3$ is selected from hydrogen and chlorine. Examples of the such additional diamine curing agents are the following compounds, manufactured by Lonza Ltd. (Basel, Switzerland):

LONZACURE® M-DIPA $R_1=C_3H_7$; $R_2=C_3H_7$; $R_3=H$
LONZACURE® M-DMA: $R_1=CH_3$; $R_2=CH_3$; $R_3=H$
LONZACURE® M-MEA: $R_1=CH_3$; $R_2=C_2H_5$; $R_3=H$
LONZACURE® M-DEA: $R_1=C_2H_5$; $R_2=C_2H_5$; $R_3=H$
LONZACURE® M-MIPA: $R_1=CH_3$; $R_2=C_3H_7$; $R_3=H$
LONZACURE® M-CDEA: $R_1=C_2H_5$; $R_2=C_2H_5$; $R_3=Cl$ wherein $R_1$, $R_2$ and $R_3$ refer to the above chemical formula. Among these, the preferred diamine curing agent is 4,4'-methylenebis(3-chloro-2,6-diethylaniline), (Lonzacure® M-CDEA), which is also available from Air Products and Chemical, Inc. (Allentown, Pa.). The foregoing diamine curing agents may be used in addition to or in place of DETDA, as a polyurethane curing agent.

Preparation of the Invention

The polyurethanes of this invention can be prepared by quasi-prepolymer or full prepolymer methods, both of which are well known in the art. The preferred method of preparing the polyurethanes according to the invention is as follows: The diisocyanate is first mixed with the OH-containing intermediate in an equivalent ratio of about 2.5 to 4.0 NCO/1.0 OH, preferably about 3.0 NCO/1.0 OH, and then reacted at 212° to 230° F. for a period of 3 to 5 hours, or 260° to 265° F. for 5 to 10 minutes, or 275° to 290° F. for 3 to 5 minutes. The heat source is then removed, the prepolymer is cooled to about 160° F. and allowed to stabilize at that temperature for about 24 hours prior to determining the percent NCO in the prepolymer. Additional diisocyanate can then be added to achieve an exact equivalent weight. The prepolymer is then reacted at about 160° F. to 180° F. with the aromatic diamine curing agent in an equivalent ratio of about 0.85 to 1.02 $NH_2/1.0$ NCO, preferably about 0.90 to 1.0 $NH_2/1.0$ NCO, and more preferably about 0.92 to 0.96 $NH_2/1.0$ NCO. The polymer is then cured at 230–275° F. for 4 to 24 hours. The curing time is longer at lower temperatures and shorter at higher temperatures.

The polyurethane polymers of this invention can be cast or compression molded. Casting is the preferred method because it produces a polyurethane polymer with optimal optical characteristics.

The prepolymer and curing agent mixture is cast into a mold prior to curing. The polyurethane material according to the invention may also be partially cured, by selecting an appropriate curing time and temperature, and then removed from the casting molds and formed into the desired shape. Using this process, the polyurethane material can be formed into a simple or complex shape and then subsequently fully cured.

A triol may be added to the prepolymer in an amount sufficient to produce about one percent cross-linking based upon equivalents of reactants, for example 4 to 8% by weight based on total reactants. Triols that are useful in the present invention include trimethylol ethane and trimethylol propane. The addition of a triol to the prepolymer increases the heat distortion temperature and in some cases improves the ballastic properties of the cured polyurethane.

Various anti-oxidants, ultraviolet stabilizers, color blockers, optical brightners, and mold release agents may be used in the preparation of the polyurethanes of this invention. For example, one or more anti-oxidants may be added to the prepolymer in an amount of up to 5% by weight based on total reactants. Anti-oxidants that are useful in the present invention include those of the multifunctional hindered phenol type. One example of a multifunctional hindered phenol type anti-oxidant is Irganox 1010, available from Ciba Geigy, which has the following chemical formula:

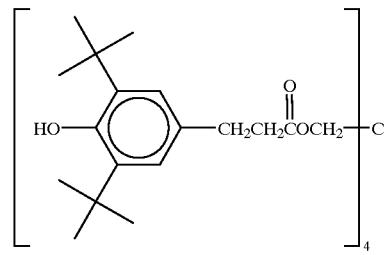

A UV-stabilizer may also be added to the prepolymer, either prior to or during the curing step, in an amount up to about 5.0%, preferably about 0.5 to 4.0% by weight based on total reactants. UV-stabilizers that are useful in the present invention include benzotriazoles. Examples of benzotriazole UV-stabilizers include Cyasorb 5411 and Tinuvin 328. Cyasorb 5411, available from American Cyanamid, has the following chemical formula:

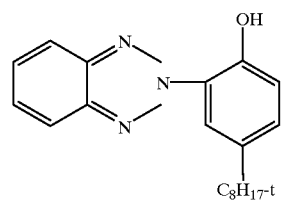

Tinuvin 328, available from Ciba Geigy, has the following chemical formula:

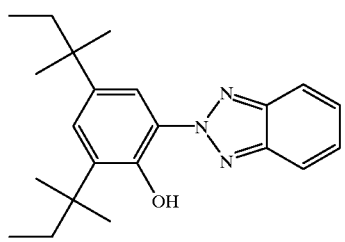

Another UV-stabilizer that may be used is Cyasorb 3604, available from American Cyanamid, which has the following chemical formula:

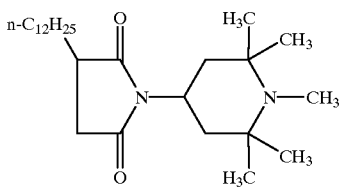

In addition to the benzatriazoles, a hindered amine light stabilizer may be added to further enhance UV protection. An example of a hindered amine light stabilizer is Tinuvin 765, available from Ciba-Geigy, which has the following chemical formula:

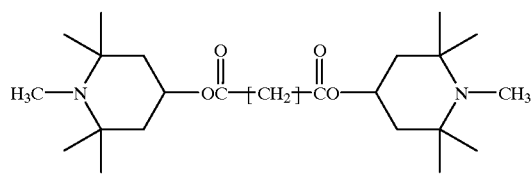

EXAMPLES I–VII

A cycloaliphatic diisocyanate is mixed with one or more polyester glycols, polycaprolactone glycols, polyether glycols, or polycarbonate glycols. The reactants are then heated to 275° F. to 290° F. under dry nitrogen, held at that temperature for 3 to 5 minutes, and allowed to react to form a prepolymer. The prepolymer is cooled to 220° to 250° F., and the UV stabilizer, anti-oxidant, color blocker, and/or optical brightener are added. The prepolymer is further cooled to 170° to 200° F. and then evacuated and stored for 24 hours at 160° F. The percent NCO is then determined.

The prepolymer is then reacted at about 160° F. to 180° F. with an aromatic diamine curing agent in an equivalent ratio of 0.85 to 1.02 $NH_2$ to 1.0 NCO. The polymer is then cured at 230° to 275° F. for 4 to 24 hours.

The reactants used in the Examples are described in Table I below:

TABLE I

| Ingredient | Description | Available From |
| --- | --- | --- |
| Ruco S-105-110 | Polyester glycol prepared from adipic acid and 1,6 hexanediol; equivalent weight of about 500 | Ruco Polymer Corp. |
| Ruco-S-105-210 | Polyester glycol prepared from adipic acid and 1,6 hexanediol; equivalent weight of about 268 | Ruco Polymer Corp. |
| Solvay Interox 396-005 | Polyester glycol prepared from E-caprolactone and 1,6-hexane diol; equivalent weight of about 387 | Solvay Interox |
| Solvay Interox 524-021 | Polyester glycol prepared from E-caprolactone and 1,6-hexane diol; equivalent weight of about 200 | Solvay Interox |
| Solvay Interox 439-045 | Polyester glycol prepared from E-caprolactone and 1,6-hexane diol; equivalent weight of about 954 | Solvay Interox |
| Ravecarb 102 | Aliphatic polycarbonate glycol; equivalent weight of about 255 | Enichem |
| Desmodur W | 4,4'-methylenebis(cyclohexyl isocyanate) containing 20% of the trans, trans isomer and 80% of the cis, cis and cis, trans isomers | Bayer Corp. |
| Ethacure 100 | 2,4-diamino-3,5-diethyl-toluene and 2,6-diamino-3,5-diethyl-toluene | Albemarle Corporation |
| Ethacure 100S | 2,4-diamino-3,5-diethyl-toluene and 2,6-diamino-3,5-diethyl-toluene with color stabilizer | Albemarle Corporation |
| Lonzacure ® M-CDEA | 4,4'-methylenebis(3-chloro-2,6-diethylaniline) | Lonza Ltd. (Basel, Switzerland); Air Products and Chemical, Inc. (Allentown, Pennsylvania). |
| Tinuvin 328 | UV-stabilizer; see supra for chemical formula | Ciba Geigy |
| Tinuvin 765 | UV-stabilizer; see supra for chemical formula | Ciba Geigy |
| Irganox 1010 | Anti-oxidant; see supra for chemical formula | Ciba Geigy |
| Exalite Blue 78-13 | Dye used as a color blocker | Exciton |
| Unitex OB | Optical brighener | Ciba Geigy |

The amounts of each reactant used in each example are set forth in Table II below:

TABLE II

| Reactant | Example I | Example II | Example III | Example IV | Example V | Example VI | Example VII | Example VIII |
|---|---|---|---|---|---|---|---|---|
| Ruco S-105-110 | 1.0 equiv. | 0.7 equiv. | 0.4 equiv. | | | | | |
| Ruco-S-105-210 | | 0.3 equiv. | 0.6 equiv. | | | | | |
| Solvay Interox 396-005 | | | | 0.5 equiv. | | | | |
| Solvay Interox 524-021 | | | | 0.4 equiv. | | | | |
| Solvay Interox 439-045 | | | | 0.1 equiv. | | | | |
| Ravecarb 102 | | | | | 1.0 equiv. | 1.0 equiv. | 0.8 equiv. | 0.8 equiv. |
| 1,6 hexane diol | | | | | | | 0.2 equiv. | 0.2 equiv. |
| Desmodur W | 3.0 equiv. | 3.0 equiv. | 3.0 equiv. | 3.0 equiv. | 3.0 equiv. | 3.5 equiv. | 3.0 equiv. | 3.25 equiv. |
| Ethacure 100S[1] | 0.93 equiv. | 0.93 equiv. | 0.93 equiv. | 0.93 equiv. | 0.93 equiv. | 0.93 equiv. | 0.93 equiv. | 0.93 equiv. |
| Tinuvin 328 | 1.0 wt. % | 1.0 wt. % | 0.75 wt. % | 0.75 wt. % | 0.75 wt. % | 0.75 wt. % | 0.75 wt. % | 0.75 wt. % |
| Tinuvin 765 | | | 0.75 wt. % | 0.75 wt. % | 0.75 wt. % | 0.75 wt. % | 0.75 wt. % | 0.75 wt. % |
| Irganox 1010 | 0.40 wt. % | 0.40 wt. % | 0.40 wt. % | 0.40 wt. % | 0.40 wt. % | 0.40 wt. % | 0.40 wt. % | 0.40 wt. % |
| Exalite Blue 78-13 | | | 1.25 ppm | 1.25 ppm | 1.25 ppm | 1.25 ppm | 1.25 ppm | 1.25 ppm |
| Uvitex OB | | | 0.60 ppm | 0.60 ppm | 0.60 ppm | 0.60 ppm | 0.60 ppm | 0.60 ppm |

[1]Amounts of Ethaeure 100S (DETDA) are given in the number of equivalents $NH_2$ per 1.0 equivalent NCO as determined in the prepolymer.

The resulting materials are evaluated for their optical, hardness, solvent resistance, heat distortion, and ballistic properties.

The polyurethane materials of Examples I–IV all have excellent optical properties with haze as low as 0.3 percent, and luminous transmittance as high as 95% at a thickness of 0.080 to 0.250 inches. The Shore D hardness of Examples I–IV ranges from 79 to 82. For examples V—VIII, the Shore D hardness is 77 to 82.

The polyurethane materials of Examples I, II, and III have a stress craze resistance of >7000 pounds per square inch when measured using isopropanol.

The V-50 rating of Examples I–IV was evaluated using a 0.25 inch thick sheet and a 0.22 caliber fragment simulating projectile. After multiple tests, the average V-50 rating is about 1,210 feet per second.

For Examples I–III, the heat distortion temperature of a 0.25 inch thick sample at 264 psi fiber stress ranges from 290° F. to 305° F., and a similar sample of the Example IV material has a heat distortion temperature of 270° F. to 280° F. at 264 psi fiber stress.

The heat distortion temperatures and ballistic properties for 0.25 inch thick samples of the Example V–VIII formulations are given in the following table:

TABLE III

| Property | Example V | Example VI | Example VII | Example VIII |
|---|---|---|---|---|
| Heat distortion temperature, 264 psi fiber stress | 126° C. (259° F.) | 155° C. (311° F.) | 145° C. (293° F.) | 157° C. (315° F.) |
| V-50 0.22 caliber FSP rating | 1,183 ft./sec. | 1,233 ft./sec. | 1,207 ft./sec. | 1,169 ft./sec. |

The foregoing disclosure of examples and other embodiments of the present invention has been presented for purposes of illustration and description. It is not intended to be exhaustive or to limit the invention to the precise examples and embodiments disclosed. Many variations and modifications of the examples and embodiments described herein will be obvious to one of ordinary skill in the art in light of the above disclosure. The scope of the invention is to be defined only by the claims appended hereto, and by their equivalents.

What is claimed is:

1. A transparent, non-elastomeric, high hardness, impact resistant polyurethane material comprising the reaction product of:
   (a) a polyurethane prepolymer prepared by reaction of an aliphatic or cycloaliphatic diisocyanate with at least one OH containing intermediate having a weight average molecular weight of from about 400 to about 2000 selected from the group consisting of polyester glycols, polycaprolactone glycols, polyether glycols, polycarbonate glycols, and mixtures thereof in an equivalent ratio of about 2.5 to 4.0 NCO/1.0 OH; and
   (b) at least one first aromatic diamine curing agent selected from the group consisting of 2,4-diamino-3,5-diethyl-toluene, 2,6-diamino-3,5-diethyl-toluene, and mixtures thereof in an equivalent ratio of about 0.85 to 1.02 $NH_2$/1.0 NCO.

2. The polyurethane of claim 1, wherein the polyurethane material is the reaction product of said polyurethane prepolymer, said at least one first aromatic diamine curing agent, and at least one second diamine curing agent selected from the group consisting of compounds of the formula:

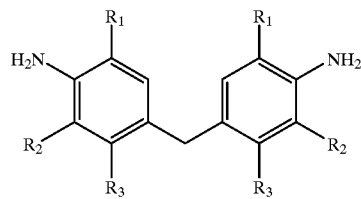

wherein $R_1$ and $R_2$ are each independently selected from the group consisting of methyl, ethyl, propyl and isopropyl groups, and $R_3$ is selected from the group consisting of hydrogen and chlorine.

3. The polyurethane material of claim 1, wherein the diisocyanate is selected from the group consisting of 4,4'-methylenebis(cyclohexyl isocyanate), 3-isocyanato-methyl-3,5,5-trimethylcyclohexyl-isocyanate, metatetramethylxylene diisocyanate, and mixtures thereof.

4. The polyurethane material of claim 1, wherein the polyurethane material has a heat distortion temperature in the range of 210° F. to 325° F. at 264 psi.

5. The polyurethane material of claim 1, wherein the polyurethane material has a heat distortion temperature of at least 250° F. at 264 psi.

6. The polyurethane material of claim 1, wherein the polyurethane material has a heat distortion temperature of at least 300° F. at 264 psi.

7. The polyurethane material of claim 1, wherein the polyurethane material is optically clear having a luminous transmittance of at least about 80%.

8. The polyurethane material of claim 1, wherein a 0.25-inch thick sheet of the polyurethane material has a V-50 0.22 caliber FSP rating of at least 1100 feet per second.

9. The polyurethane material of claim 1, wherein the diamine curing agent is reacted with the prepolymer in an equivalent ratio of about 0.90 to 1.0 $NH_2/1.0$ NCO.

10. The polyurethane material of claim 1, wherein the weight average molecular weight of the OH-containing intermediate is from about 400 to about 1000.

11. The polyurethane material of claim 1, wherein the OH-containing intermediate is selected from the group consisting of: (a) esterification products of adipic acid with one or more diols selected from the group consisting of 1,4-butanediol, 1,6-hexanediol, neopentyl glycol, and 1,10-decanediol; (b) reaction products of E-caprolactone with one or more diols selected from the group consisting of 1,4-butane diol, 1,6-hexane diol, neopentyl glycol, and 1,10-decanediol; (c) polytetramethylene glycol; (d) aliphatic polycarbonate glycols; and (e) mixtures of such OH-containing intermediates.

12. The polyurethane material of claim 1, wherein the cycloaliphatic diisocyanate is an isomeric mixture of 4,4'-methylenebis(cyclohexyl isocyanate) which comprises at least 20 percent of the trans,trans isomer of 4,4'-methylenebis(cyclohexyl isocyanate).

13. The polyurethane material of claim 1, wherein the prepolymer further comprises a UV-stabilizer.

14. The polyurethane material of claim 13, wherein the UV-stabilizer is selected from the group consisting of benzotriazoles, hindered amine light stabilizers and mixtures thereof.

15. The polyurethane material of claim 1, wherein the prepolymer further comprises an anti-oxidant.

16. The polyurethane material of claim 15, wherein the anti-oxidant is a multifunctional hindered phenol.

17. The polyurethane material of claim 1, wherein the polyurethane material has a stress craze resistance of >7000 pounds per square inch when measured using isopropanol.

18. The polyurethane material of claim 1, wherein the prepolymer further comprises a triol in an amount sufficient to produce 1% cross-linking based upon equivalents of reactants.

19. The polyurethane material of claim 18, wherein the triol is selected from the group consisting of trimethylol ethane, trimethylol propane, and mixtures thereof.

20. An eyewear lens made from the polyurethane material according to claim 1.

21. The eyewear lens of claim 20, wherein said lens is selected from the group consisting of sun lenses, ophthalmic lenses and protective lenses.

22. The polyurethane material of claim 1, wherein said diamine curing agent is color-stabilized.

23. A transparent, non-elastomeric high hardness, impact resistant polyurethane material comprising the reaction product of:

(a) a polyurethane prepolymer prepared by reaction of a cycloaliphatic diisocyanate selected from the group consisting of 4,4'- methylenebis(cyclohexyl isocyanate), 3-isocyanato-methyl-3,5,5-trimethylcyclohexyl-isocyanate, metatetramethylxylene diisocyanate, and mixtures thereof with at least one OH-containing intermediate having a weight average molecular weight of from about 400 to about 2000 selected from the group consisting of: (a) esterification products of adipic acid with one or more diols selected from the group consisting of 1,4-butanediol, 1,6-hexanediol, neopentyl glycol, and 1,10-decanediol; (b) reaction products of E-caprolactone with one or more diols selected from the group consisting of 1,4-butane diol, 1,6-hexane diol, neopentyl glycol, and 1,10-decanediol; (c) polytetramethylene glycol; (d) aliphatic polycarbonate glycols; and (e) mixtures of such OH-containing intermediates in an equivalent ratio of about 2.5 to 4.0 NCO/1.0 OH; and (b) at least one diamine curing agent selected from the group consisting of 2,4- diamino-3,5-diethyl-toluene, 2,6-diamino-3,5-diethyl-toluene, and mixtures thereof, in an equivalent ratio of about 0.95 to 1.02 $NH_2/1.0$ NCO, wherein the polyurethane material has a heat distortion temperature of at least 300° F. at 264 psi.

24. An eyewear lens made from the polyurethane material according to claim 23.

25. The eyewear lens of claim 24, wherein said lens is selected from the group consisting of sun lenses, ophthalmic lenses and protective lenses.

26. The polyurethane material of claim 23, wherein said diamine curing agent is color-stabilized.

27. The polyurethane material of claim 23, wherein the polyurethane material is optically clear having a luminous transmittance of at least about 80%.

28. The polyurethane material of claim 23, wherein a 0.25-inch thick sheet of the polyurethane material has a V-50 0.22 caliber FSP rating of at least 1100 feet per second.

29. The polyurethane material of claim 23, wherein the weight average molecular weight of the OH-containing intermediate is from about 400 to about 1000.

30. The polyurethane material of claim 23, wherein the diisocyanate is an isomeric mixture of 4,4'-methylenebis(cyclohexyl isocyanate) which comprises at least 20 percent of the trans,trans isomer of 4,4'-methylenebis(cyclohexyl isocyanate).

31. The polyurethane material of claim 23, wherein the prepolymer further comprises a UV-stabilizer.

32. The polyurethane material of claim 31, wherein the UV-stabilizer is selected from the group consisting of benzotriazoles, hindered amine light stabilizers and mixtures thereof.

33. The polyurethane material of claim 23, wherein the prepolymer further comprises an anti-oxidant.

34. The polyurethane material of claim 33, wherein the anti-oxidant is a multifunctional hindered phenol.

35. The polyurethane material of claim 23, wherein the polyurethane material has a stress craze resistance of >7000 pounds per square inch when measured using isopropanol.

36. The polyurethane material of claim 23, wherein the prepolymer further comprises a triol in an amount sufficient to produce 1% cross-linking based upon equivalents of reactants.

37. The polyurethane material of claim 36, wherein the triol is selected from the group consisting of trimethylol ethane, trimethylol propane, and mixtures thereof.

* * * * *

UNITED STATES PATENT AND TRADEMARK OFFICE
CERTIFICATE OF CORRECTION

PATENT NO.   : 6,127,505
DATED        : October 3, 2000
INVENTOR(S)  : Edwin C. Slagel Page 1 of 1

It is certified that error appears in the above-identified patent and that said Letters Patent is hereby corrected as shown below:

<u>Title page,</u>
ABSTRACT,
Line 7, "vehicles, glazings" should read -- vehicles glazings --

<u>Column 1,</u>
Line 60, delete "an aliphatic or"
Line 64, after "about 2000 with" insert -- an aliphatic or --

<u>Column 12, claim 23,</u>
Line 2, delete "cycloaliphatic"

Signed and Sealed this

Eighteenth Day of December, 2001

Attest:

JAMES E. ROGAN
*Attesting Officer*   *Director of the United States Patent and Trademark Office*